US011520638B1

(12) United States Patent
Telang et al.

(10) Patent No.: US 11,520,638 B1
(45) Date of Patent: *Dec. 6, 2022

(54) COMBINED ACTIVE AND PREINITIALIZED RESOURCE MANAGEMENT FOR RAPID AUTOSCALING

(71) Applicant: Amazon Technologies, Inc., Seattle, WA (US)

(72) Inventors: Nilesh Girish Telang, Sunnyvale, CA (US); Abhishek Saha, Sunnyvale, CA (US); Dhruven Nimesh Shah, Sunnyvale, CA (US); Pratik Shilwant, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 170 days.

This patent is subject to a terminal disclaimer.

(21) Appl. No.: 16/912,614

(22) Filed: Jun. 25, 2020

(51) Int. Cl.
*G06F 9/50* (2006.01)
*G06F 9/445* (2018.01)

(52) U.S. Cl.
CPC ........ *G06F 9/5083* (2013.01); *G06F 9/44578* (2013.01)

(58) Field of Classification Search
CPC ... G06F 2009/45562; G06F 2009/4557; G06F 9/45558; H04L 41/0896; H04L 41/50; H04L 43/0817
See application file for complete search history.

(56) References Cited

U.S. PATENT DOCUMENTS

| | | | |
|---|---|---|---|
| 4,208,809 A | 6/1980 | Schwartz | |
| 9,189,285 B2* | 11/2015 | Ng | H04N 21/4516 |
| 9,372,735 B2* | 6/2016 | Calder | G06F 9/5077 |
| 9,372,753 B2* | 6/2016 | Parladori | H04L 43/0805 |
| 10,013,267 B1* | 7/2018 | Wagner | G06F 9/50 |
| 10,664,297 B2* | 5/2020 | Bruun | H04L 41/0896 |

(Continued)

OTHER PUBLICATIONS

Alex Karcher, "Announcing the Azure Functions Premium plan for enterprise serverless workloads", Retrieved from https://azure.microsoft.com/en-us/blog/announcing-the-azure-functions-premium-plan-for-enterprise-serverless-workloads/, Apr. 3, 2019, pp. 1-7.

(Continued)

*Primary Examiner* — Jorge A Chu Joy-Davila
(74) *Attorney, Agent, or Firm* — Robert C. Kowert; Kowert, Hood, Munyon, Rankin & Goetzel, P.C.

(57) ABSTRACT

A scaling manager manages deques that track groups of preinitialized instances used to scale respective groups of active compute instances. Various techniques for deque management include a technique where a total instance quantity is preconfigured for the total number of instances assigned to both the group and the deque of preinitialized instances. As the size of the group grows for scale-ups, the size of the deque may go down. For example, the deque is not replenished when the group scales, but does expand when the group scales down. The total instance quantity may be bounded, in some examples, and an additional "buffer amount" of preinitialized instances may be implemented to provide a safety margin for burst scaling, which can be further enhanced by transferring instances between data structures of different groups of instances in some cases.

20 Claims, 13 Drawing Sheets

(56) References Cited

U.S. PATENT DOCUMENTS

| | | | |
|---|---|---|---|
| 2007/0288224 A1* | 12/2007 | Sundarrajan | G06F 9/5072 703/22 |
| 2008/0263553 A1* | 10/2008 | Lueck | G06F 9/505 718/102 |
| 2010/0313063 A1* | 12/2010 | Venkataraja | G06F 9/5022 714/1 |
| 2011/0029970 A1* | 2/2011 | Arasaratnam | G06F 9/00 718/1 |
| 2011/0099403 A1* | 4/2011 | Miyata | G06F 9/5088 718/1 |
| 2012/0096457 A1* | 4/2012 | Gupta | G06F 9/45558 718/1 |
| 2013/0091284 A1 | 4/2013 | Rothschild | |
| 2014/0342819 A1* | 11/2014 | Bruno, Jr. | A63F 13/30 463/29 |
| 2015/0261561 A1* | 9/2015 | Ashok | G06F 9/45558 718/1 |
| 2015/0301963 A1 | 10/2015 | Tatar | |
| 2015/0378765 A1* | 12/2015 | Singh | G06F 9/45558 718/1 |
| 2017/0286148 A1* | 10/2017 | Zou | G06F 9/455 |
| 2018/0101413 A1* | 4/2018 | Watanabe | G06F 9/505 |
| 2018/0129524 A1* | 5/2018 | Bryant | G06F 11/3006 |
| 2018/0234493 A1* | 8/2018 | Ye | H04L 67/1002 |
| 2019/0384644 A1* | 12/2019 | Fear | G06F 9/5077 |

OTHER PUBLICATIONS

Unknown, "Overview of autoscale with Azure virtual machine scale sets", Retrieved from https.//docs.microsoft.com/en-us/azure/virtual-machine-scale-sets/virtual-machine-scale-sets-autoscale-overview on Jun. 10, 2020, pp. 1-7.

Google, "Autoscaling groups of instances", Retrieved from https://cloud.google.com/compute/docs/autoscaler on Jun. 10, 2020, pp. 1-6.

U.S. Appl. No. 16/912,608, filed Jun. 25, 2020, Nilesh Girish Telang et al.

Peng, Fan et al. "Optimal Clustering of Railroad Track Maintenance Jobs", Computer-aided civil and infrastructure engineering, Apr. 2014, vol. 29 (4), pp. 235-247.

* cited by examiner

US 11,520,638 B1

COMBINED ACTIVE AND PREINITIALIZED RESOURCE MANAGEMENT FOR RAPID AUTOSCALING

BACKGROUND

Scaling includes the ability to increase or decrease the compute capacity of your application. For example, scaling generally starts with an event, or scaling action, which instructs an auto scaling group to either launch or terminate compute instances (e.g., virtual instances or non-virtual instances). Adding a new ("cold") instance to an autoscaling group may take more time than is desirable (a "cold-start problem"). For example, when scaling up, the preinitialization time (sometimes measured as mean time to traffic (MTTT) or otherwise) may be unacceptable, adding risk to availability of the application. Preinitialization time for adding an instance into an auto scaling group may be high due to the number of operations that need to be performed on a standard host before it is capable of servicing traffic for the auto scaling group, or for other reasons, and may be variable, as well.

Figure 1:
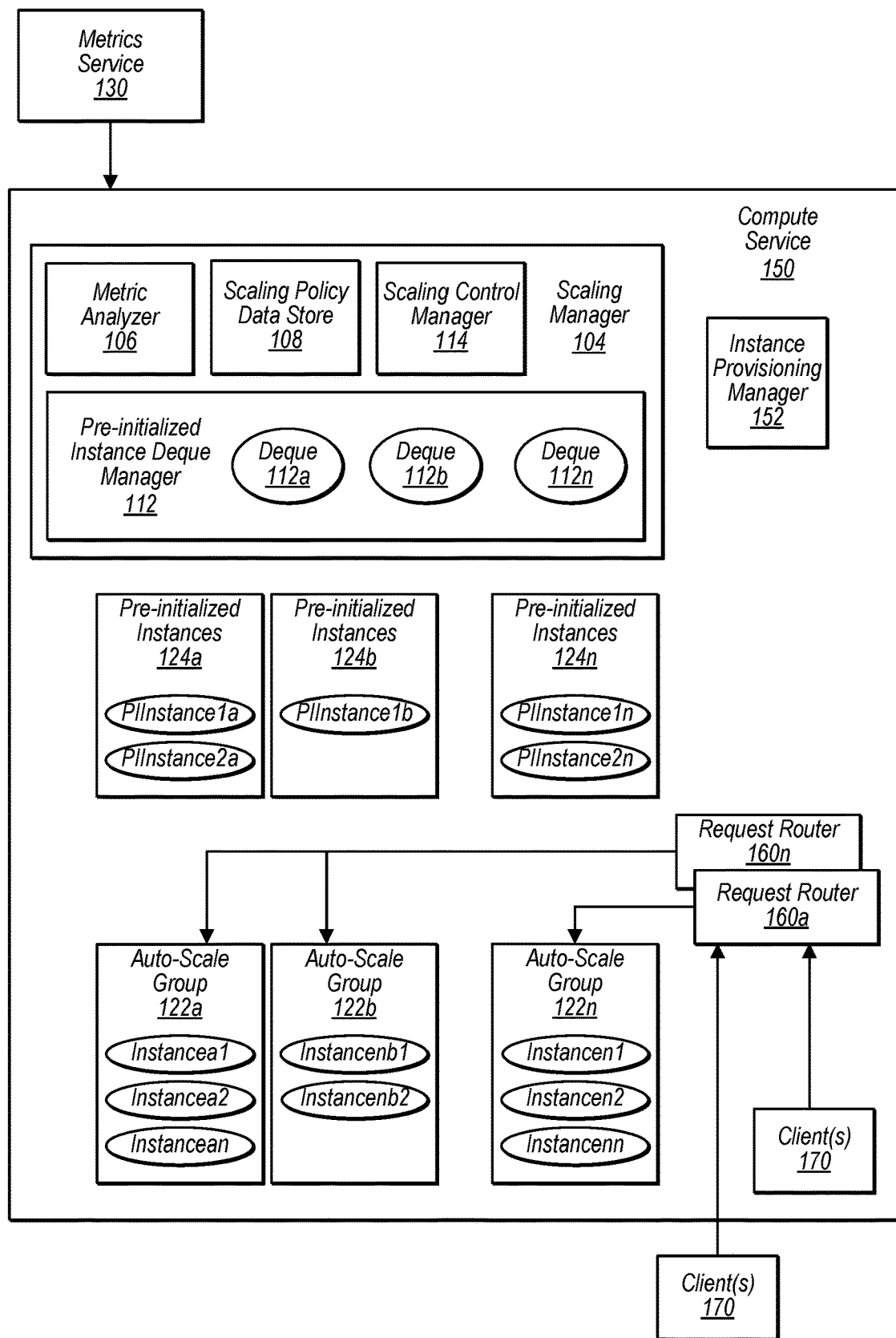
FIG. 1 is a block diagram of an architecture for a system that implements combined active and preinitialized resource management for rapid autoscaling, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and systems implement combined active and preinitialized resource management for rapid autoscaling. In embodiments, autoscaling utilizes preinitialized instances (sometimes referred to as "pre-warmed instances") to address a "cold start problem" (e.g., unacceptably long preinitialization times that can slow scale-up of a group of instances). For example, a system may implement an interface that allows customers to configure a size for a data structure (e.g., a buffer, queue, deque (double-ended queue) or the like) that identifies a quantity of preinitialized compute instances for scaling the group of active compute instances of pre-warmed (sometimes referred to herein as "preinitialized") instances to be used to more quickly scale-up the group. Additionally, disclosed are various different implementations of techniques to manage the size of the collection of preinitialized instances. For example, generally when scaling up a group, a preinitialized instance is moved from the collection of preinitialized instances for that group to the group and the data structure (e.g., a deque, queue, etc.) is immediately replenished with an identifier of new preinitialized instance, in various embodiments. However, other embodiments without replenishment are disclosed herein.

When scaling up (e.g., using reactive autoscaling, due to dynamically identified conditions or otherwise) a preinitialization time may be unacceptably long, as it may add risk to availability. For example, a preinitialization time for adding an instance into a group may be high due to a relatively high number of operations that need to be performed on a standard host before it is capable of servicing traffic for the group. In some embodiments, predictive auto scaling can improve upon reactive autoscaling. But even predictive auto scaling may be imperfect as prediction may be error-prone (e.g., prediction may not correctly predict intermittent spikes in traffic, or the data that serves as a basis for the prediction is only loosely-correlated, etc.). Described herein are approaches to significantly reduce the a preinitialization time when adding hosts to groups, to thereby increase the usability of auto scaling.

Throughout the disclosure, reference is sometimes made to a particular type of group—autoscaling groups (ASGs)—but the techniques herein are equally applicable to the more general category of groups of instances in general, as well.

One example technique (e.g., a scale-up-rate technique) for managing the collections of preinitialized instances tracked by the data structure includes a monitoring system that monitors the historical scale-up rate for the particular group of instances and adjusts the size of the collection of preinitialized instances for that group based on the monitored scale-up rate and based on the instance preinitialization time (e.g., MTTT or other measure) for instances for that group. The monitored scale-up rate may come from any of various sources, such as, but not limited to, a configuration parameter, from metrics collected from some other group, from analysis of the group to which the rate is applied, etc. Example benefits may include a more optimized sizing of the deque so that resources are not wasted on more preinitialized instances than needed for a particular group. Another example benefit is automated adaptation of the size of the deque as scaling demands on the group change over time (e.g., as MTTT changes over time, as traffic volume changes, etc.).

A second technique for managing the data structure tracking the collection of preinitialized instances is sometimes referred to herein as the assigned-but-unused-size technique that is used to set the data structure size. For some embodiments of this technique, a total instance quantity is preconfigured for the total number of instances assigned to both the group and the group's collection of preinitialized instances. As the size of the group scales up, the size of the data structure scales down, for example. The data structure is not replenished when the group scales up as in the first technique, but does expand when the group scales down in embodiments (unlike the first technique, for example). In embodiments, the size of the data structure always corresponds to the total number of assigned instances minus the number of instances currently active in the group (an assigned instance is an instance associated with a group, irrespective of whether the instances are processing requests, in embodiments). In embodiments, the size of the deque ebbs and flows with the scaling, as opposed to being resized based on monitoring scale-up rates over time. The preconfigured total instance size for the data structure plus the group can be set by the customer, or perhaps by the system based on knowledge of past scaling rates for instances of the same type as in the group, in embodiments. But in that case, the size is not repeatedly updated as in the rate-based technique, for example. A bound can be placed on the total size of the group of instances plus the corresponding collection of preinitialized instances for the group, if desired, for some embodiments.

Also disclosed is an embodiment with an additional "buffer amount" of preinitialized instances in the data structure to provide a safety margin for burst scaling, which can be further enhanced by transferring instances between data structures of different groups of instances in some cases (e.g., sharing preinitialized instances among different groups). Being able to share instances from one group or data structure to another may reduce or eliminate the need to maintain reserve "cold" instances in a common pool, and may allow for faster preinitialization in some cases.

Autoscaling and Scaling Policies

Generally, scaling includes the ability to increase or decrease the compute capacity of an application. Scaling starts with an event, or scaling action, which instructs an auto scaling group to either launch or terminate instances (e.g., virtual or non-virtual instances or combinations thereof) in embodiments. Auto scaling provides a number of ways to adjust scaling to best meet the needs of applications.

In embodiments, configuration settings for dynamic scaling define how to scale the capacity of a group (e.g., an auto scaling group or other group) in response to changing demand. For example, a web application currently runs on two instances, and it is desirable or the CPU utilization of the auto scaling group to stay at around 50 percent when the load on the application changes. This would provide extra capacity to handle traffic spikes without maintaining an excessive number of idle resources. An auto scaling group can be configured to scale dynamically to meet this need by defining a scaling policy that the system relies on to scale-up an auto scaling group (add more instances) to deal with high demand at peak times, and scale-down a group (run fewer instances) to reduce costs during periods of low utilization.

In some embodiments, a scaling policy instructs a scaling service to track specific metrics, and it defines what action to take in case of a corresponding alarm The metrics that are used to trigger an alarm (or to trigger calculation of a size of a data structure that tracks preinitialized instances or the like, etc.) are an aggregation of metrics coming from all of the instances in the auto scaling group. For example, take an auto scaling group with two instances, where one instance is at 60 percent CPU and the other is at 40 percent CPU. On average, they are at 50 percent CPU. When the policy is in effect, auto scaling adjusts the group's desired capacity up or down when the alarm is triggered, for example.

When a scaling policy is executed, if the capacity calculation produces a number outside of the minimum and maximum size range of the group, auto scaling ensures that the new capacity never goes outside of the minimum and maximum size limits, in some embodiments.

Preinitialized Instances

In embodiments, an instance that has completed the preinitialization process (e.g., illustrated in FIG. 7, described below) and is fully initialized for serving traffic for the group, but is not assigned to process traffic or requests, is a preinitialized instance. The instance may be referred to as preinitialized as it is initialized before it is needed to process traffic, in some embodiments. Preinitialization includes but is not limited to pulling all required packages and starting up all required services, for example. In embodiments, no traffic is directed to the preinitialized instance. This is achieved by making the instance ready, but not directing traffic to it, for example, by not adding the instance to a group request router, or load balancer, etc. for which the instance would process traffic (e.g., by not enabling the address for the request router, for example). In some embodiments, groups are associated with, or assigned to respective collections (e.g., queues or deques, etc.) of preinitialized instances that are assigned to, but not used by the ASG (e.g., a request router is not sending the preinitialized instances of the group traffic to process). Once a preinitialized instance is activated—added to the ASG group to process request traffic, it is an ASG group member, and no longer a preinitialized instance member of the collection of preinitialized instances tracked by the data structure, as it is now receiving traffic, for example.

In embodiments, the life cycle of a preinitialized instance may be unique from other instances. For example, scaling-down of an autoscaling group (ASG) removes instances from the ASG, not preinitialized instances. In embodiments, each ASG is associated with a deque (or a queue, or the like, depending on implementation) of preinitialized instances. Not all entries in the deque are necessarily fully preinitialized and may be in various different states of preinitialization at any given time. Generally, an identifier of an instance is placed into a deque at about the same time (before or after) the preinitialization of the instance begins. As the deque may hold a quantity of identifiers of various instances that began preinitialization at various times, those instances may be in varying states of preinitialization (e.g., anywhere from an early-in-the-preinitialization-process state to fully-initialized-and-waiting-to-be-assigned-traffic state, etc.). Generally, as described herein, preinitialized instances with identifiers towards the front of the deque have completed more of the preinitialization process than instances with identifiers towards the back of the deque. For example, identifiers of instances that have yet to be initialized are added to the back of the deque, whereas instances being scaled-down from the ASG (already initialized) may be placed at the front of the deque, if there is space. Generally, preinitialized instances in the front of the deque are the first ones moved into the ASG as they are more likely to be fully-initialized, and more readily-available to process request traffic.

An ASG may have a maximum active instance parameter and a desired active instance parameter, in embodiments. In embodiments, keeping preinitialized instances in a deque, instead of adding them to the ASG, prevents the ASG from being overloaded with hosts (underutilization of resources). Also, in embodiments, preinitialized instances from individual deques may be shared across ASGs. For example, if a first deque of a first ASG is empty (or if instances are not fully initialized yet), and instances are not available from a common pool of instances, the first ASG may request to use an unused preinitialized instance from a second deque associated with a second ASG. In some embodiments, a buffer of preinitialized instances associated with an ASG may be used by other ASGs. For example, some techniques may include adding a buffer amount (e.g., some percentage or the like) in the calculation of the deque size to ensure there are extra preinitialized instances for unexpected bursts in traffic or for unexpected failures.

Figure 2:
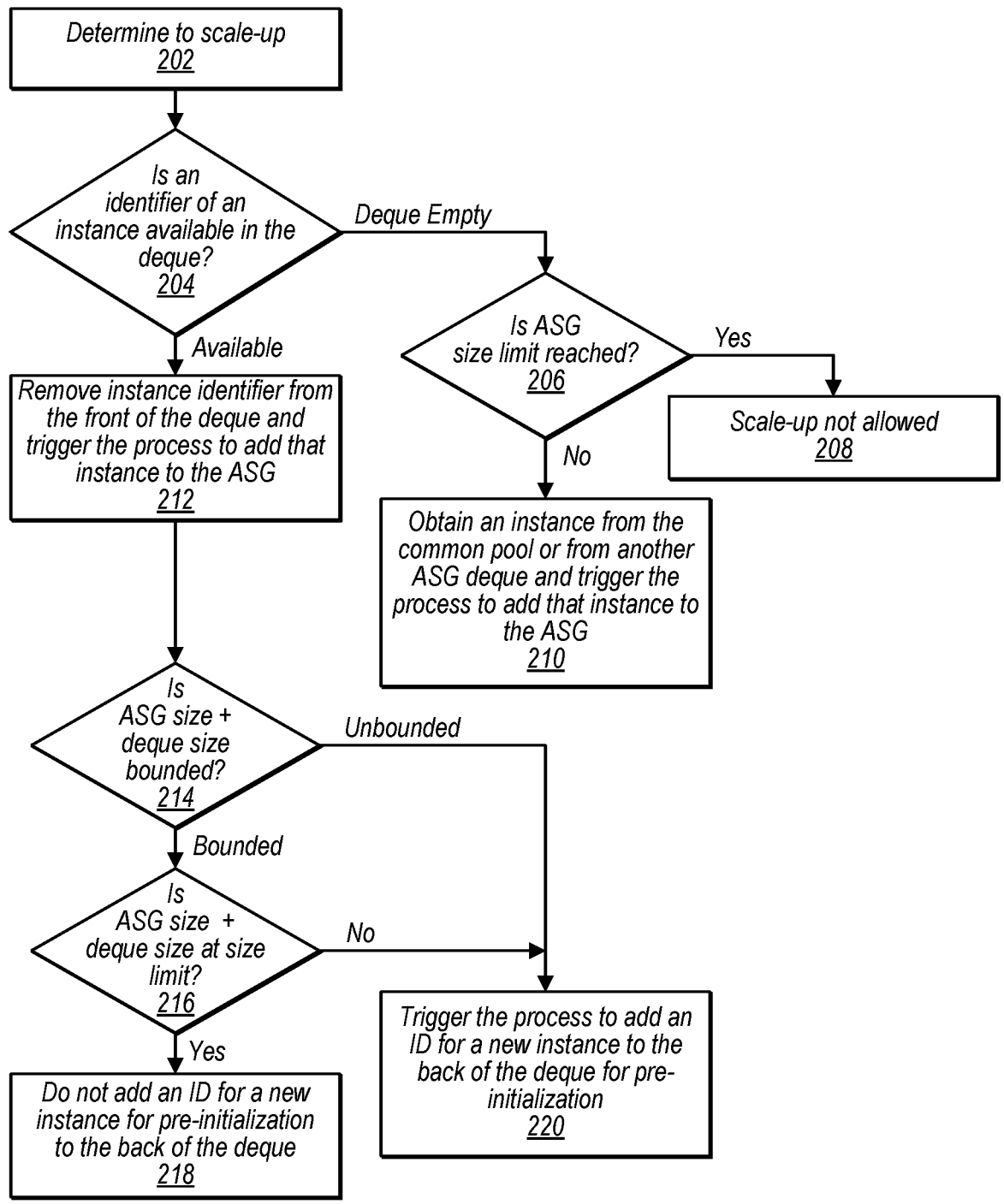
FIG. 2 is a process chart that illustrates a scale-up process for a system that implements scaling of groups of compute instances using rate-based dynamically-sized deques of pre-initialized instances, according to at least some embodiments.
Figure 3:
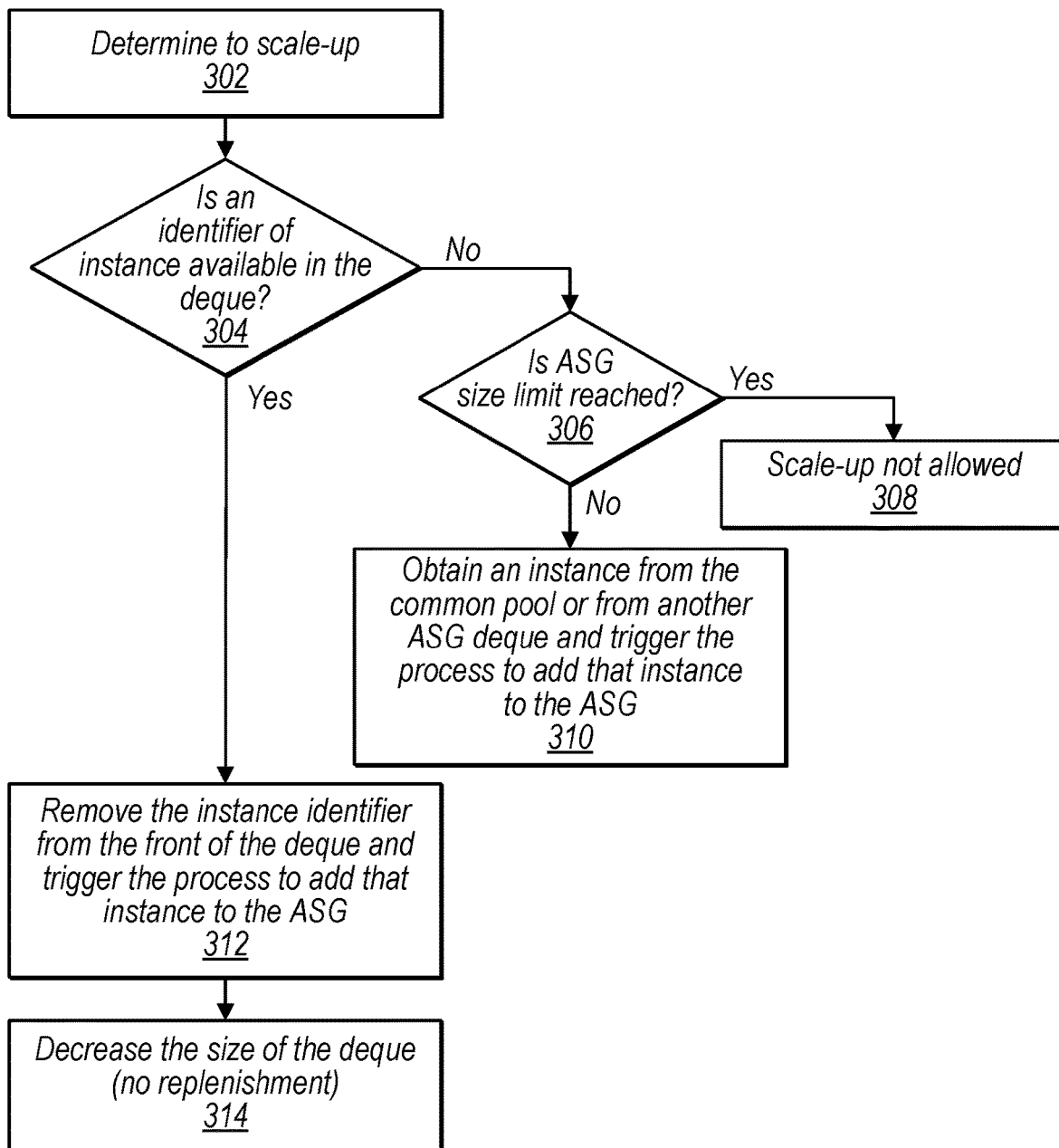
FIG. 3 is a process chart that illustrates an alternative scale-up process for a system that implements scaling of groups of compute instances having a predetermined quantity of instances shared between the group and a respective collection of preinitialized instances for the autoscaling group, according to at least some embodiments.
Figure 4:
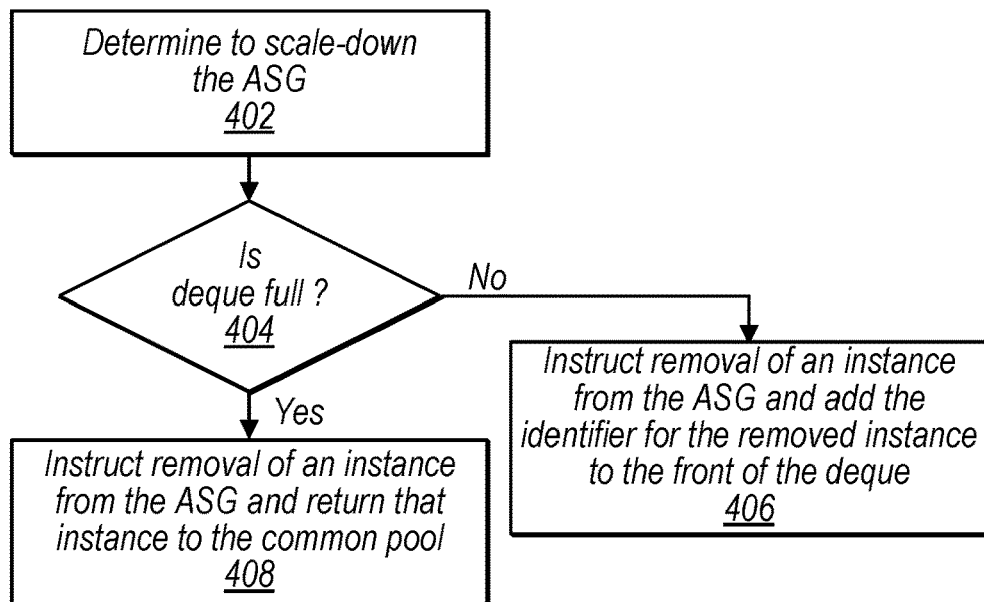
FIG. 4 is process chart that illustrates an embodiment of a scale-down process for a system that implements combined active and preinitialized resource management for rapid autoscaling, according to at least some embodiments.
Figure 5:
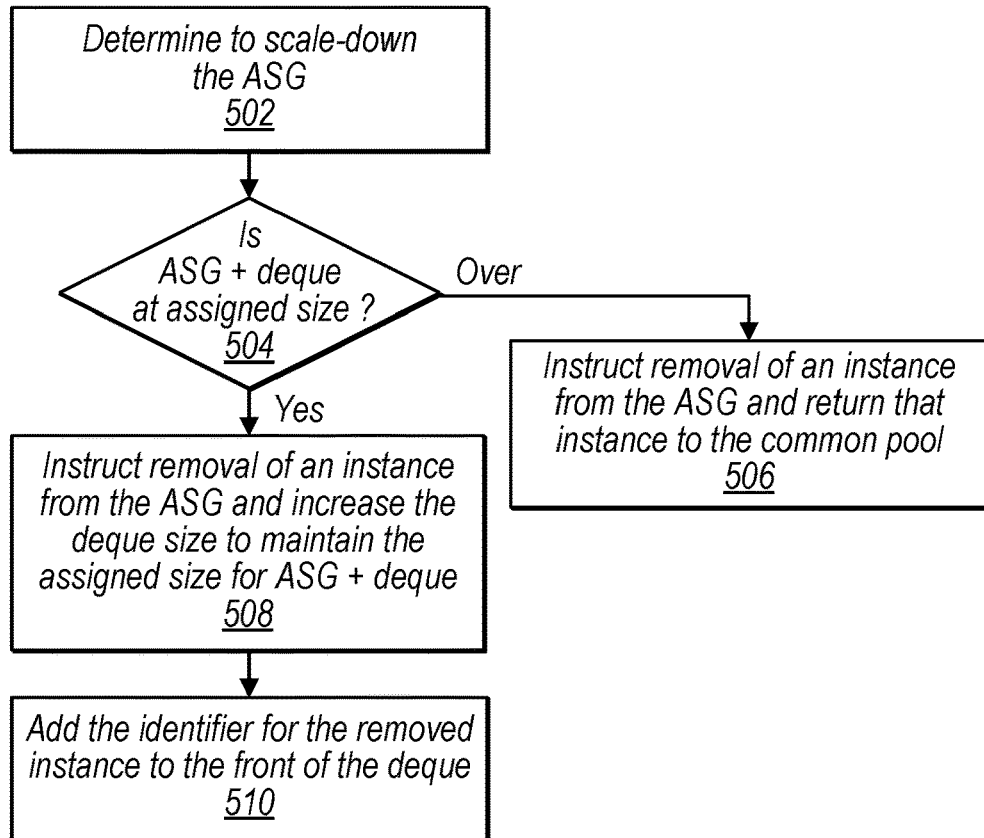
FIG. 5 is process chart that illustrates an alternative embodiment of a scale-down process for a system that implements combined active and preinitialized resource management for rapid autoscaling, according to at least some embodiments.
Figure 6:
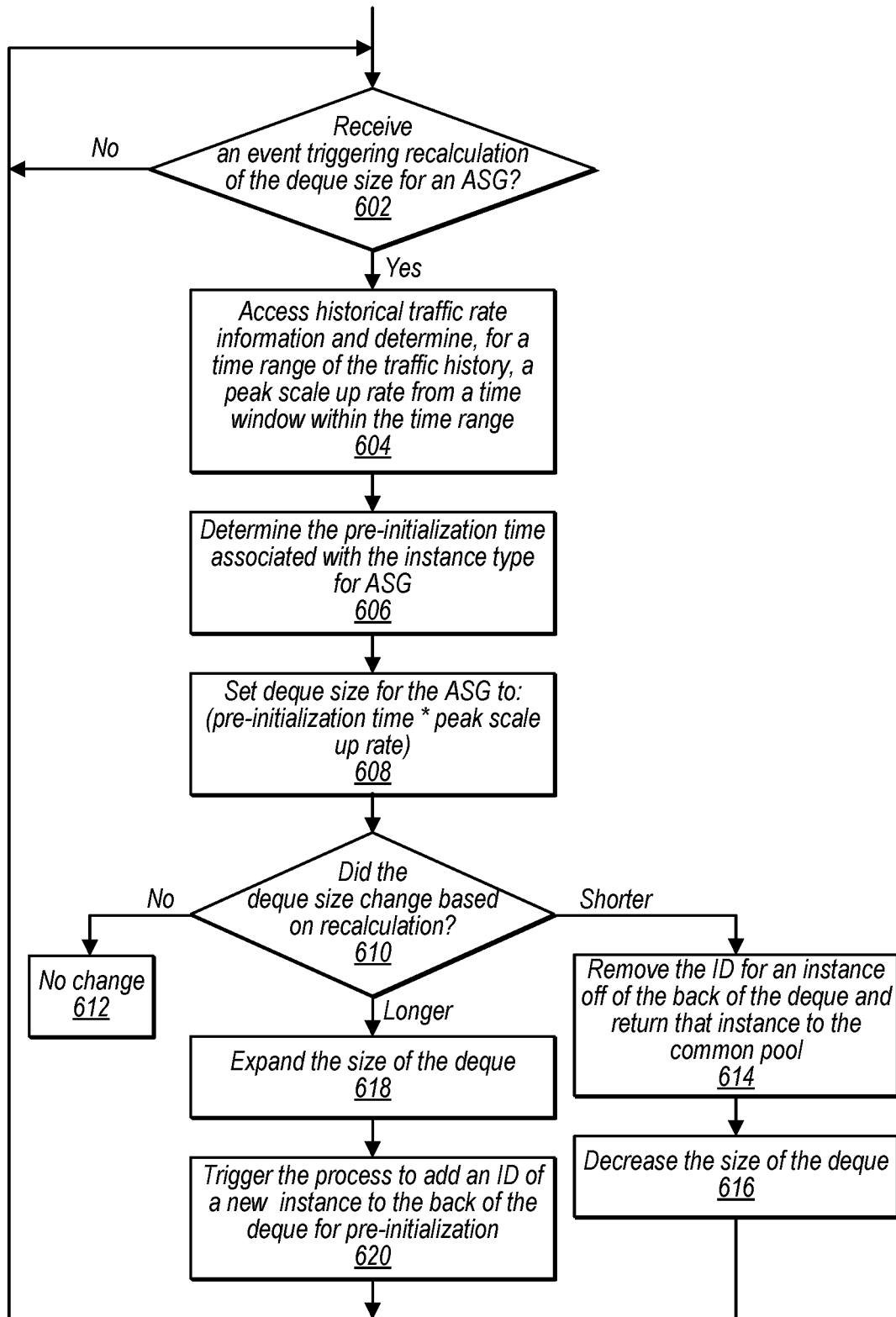
FIG. 6 is a process flow diagram for calculating queue size for a system that implements combined active and preinitialized resource management for rapid autoscaling, according to at least some embodiments.
Figure 7:
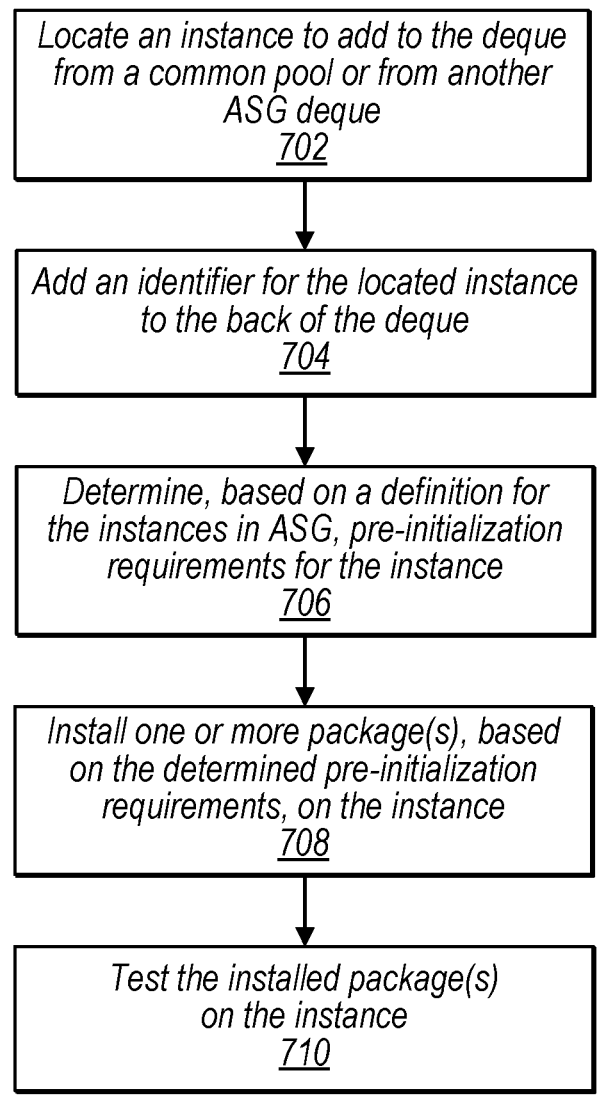
FIG. 7 is a process flow diagram for pre-initializing instances for a system that implements combined active and preinitialized resource management for rapid autoscaling, according to at least some embodiments.
Figure 8:
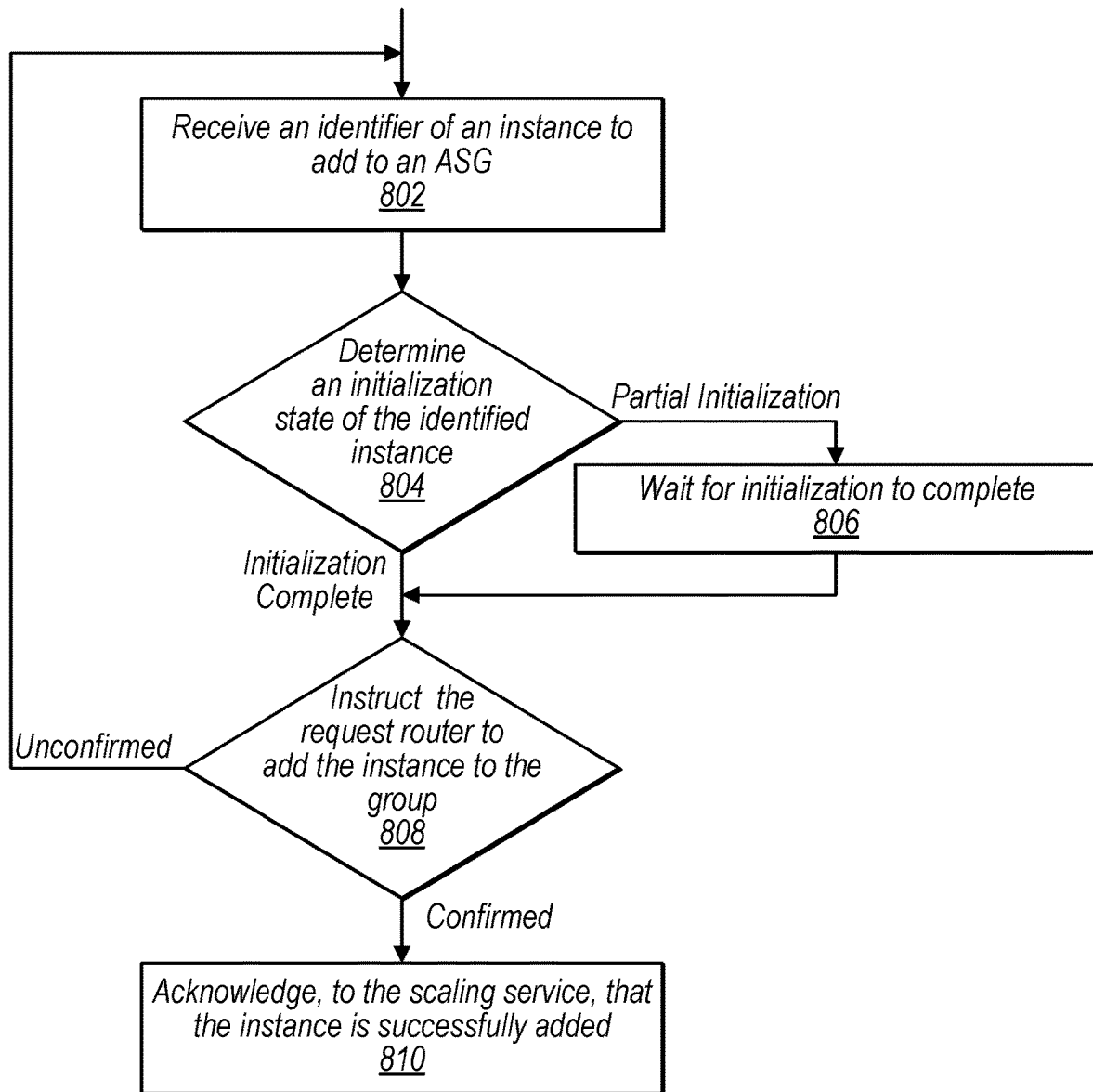
FIG. 8 is a process flow diagram that illustrates adding preinitialized instances specified by a data structure to a group of instances, for a system that implements combined active and preinitialized resource management for rapid autoscaling, according to at least some embodiments.
Figure 13:
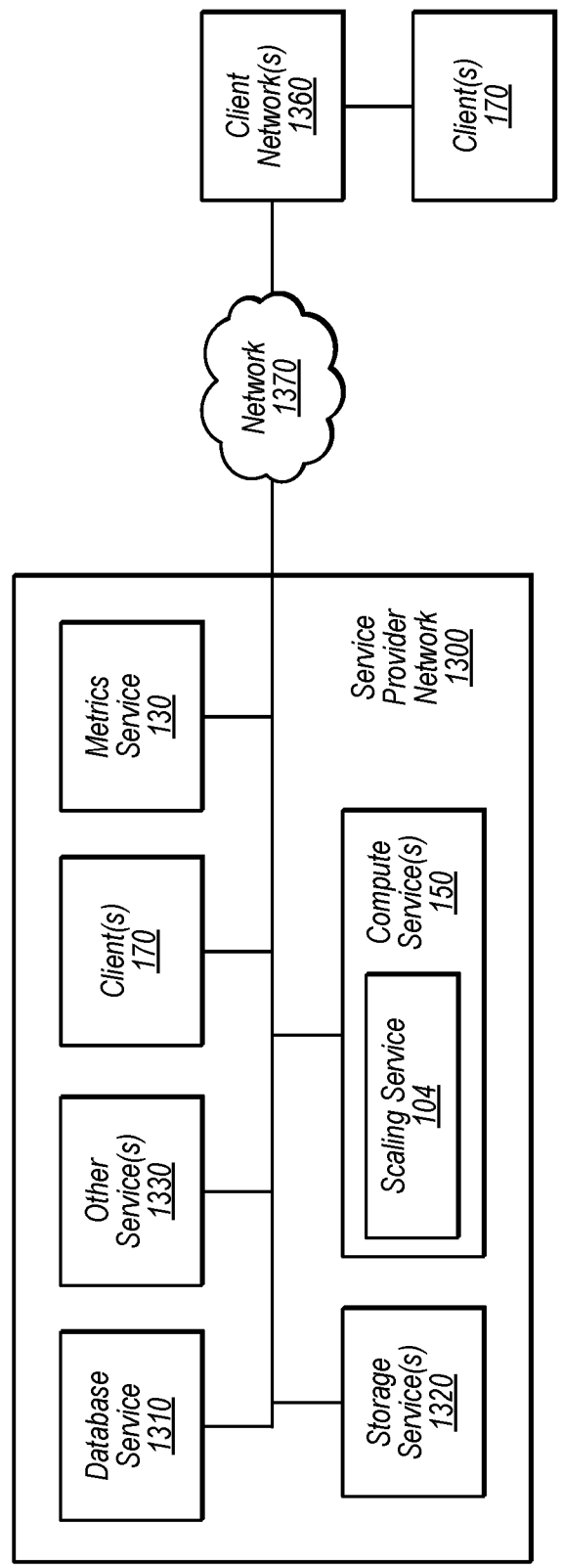
FIG. 13 is a block diagram illustrating a service-provider based architecture for a system that implements combined active and preinitialized resource management for rapid autoscaling, according to at least some embodiments.
Figure 14:
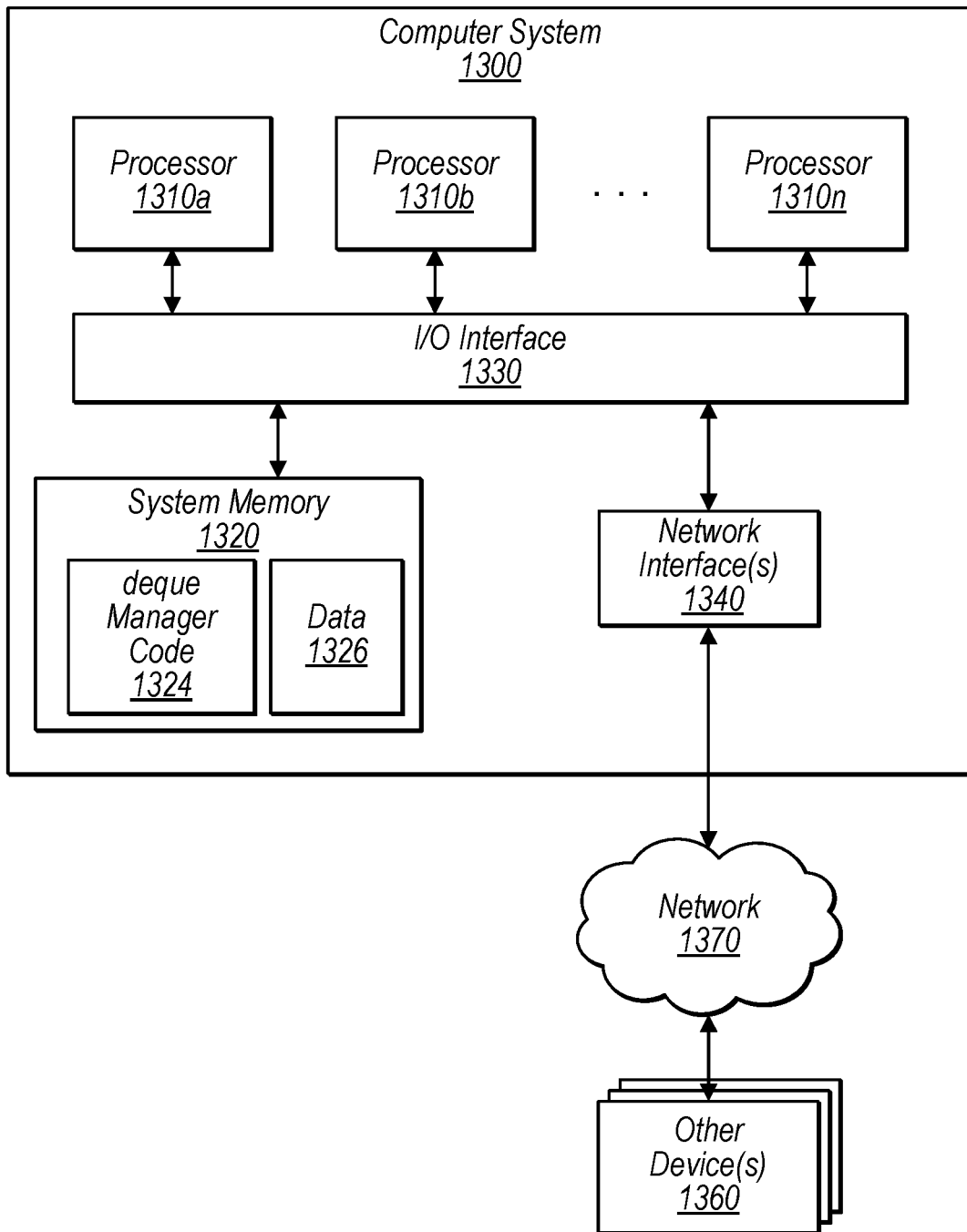
FIG. 14 is a block diagram illustrating an example computer system that may be used in some embodiments of a system that implements combined active and preinitialized resource management for rapid autoscaling, according to at least some embodiments.

Described below are various architectural, process, and block diagram figures. FIGS. 1, 13 and 14 are system architectures for implementing combined active and preinitialized resource management for rapid autoscaling. FIGS. 2 and 4 are directed to a rate-based technique for implementing combined active and preinitialized resource management for rapid autoscaling and FIGS. 3 and 5 are directed to an assigned-but-unused technique for implementing combined active and preinitialized resource management for rapid autoscaling. Either technique may be implemented by the system architectures. FIGS. 6, 7 and 8 further illustrate various techniques that may be combined with the other techniques, in various embodiments. FIGS. 9, 10, 11A-B, and 12 graphically illustrate functionality of an API that implements combined active and preinitialized resource management for rapid autoscaling. While the illustrated embodiments describe ASGs and corresponding deques as a particular example implementation, similar functionality may be performed by architectures using other groups of instances and other types of data structures.

FIG. 1 is a block diagram of an architecture for a system that implements combined active and preinitialized resource management for rapid autoscaling, according to at least some embodiments. Various components illustrated in FIG. 1 may perform functionality illustrated in FIGS. 2-12, as described below.

Illustrated is a compute service 150 with instance provisioning manager 152, request routers 160*a*, 160*n* that direct request traffic to autoscale groups 122*a*-*n* on behalf of clients 170 (external and/or internal to the compute service) that generate the request traffic. Instances as referred to herein may include virtual instances or physical instances or systems with various combinations thereof, in embodiments. Instance provisioning manager 152 may manage the provisionment of compute instances of the compute service, in response to requests from the scaling manager 104, for example.

For example, the scaling manager 104 may request that the instance provisioning manager provide the scaling manager with instances to be preinitialized (illustrated in FIG. 7, described below) and/or may request that the provisioning manager 152 preinitialize the instances. In embodiments, compute service 150 may implement, manage and provide an API for accessing a fleet of compute instances. At least some of the fleet of compute instances may form one or more common pools of instances. Various different pools of instances may be grouped based on the underlying resources of the instances, in embodiments. Instances from a common pool may be provided in response to clients that request an instance (e.g., other services of a service provider may be clients that request the instance, one or more components of the scaling manager 102 may act as a requesting client, in embodiments, etc.).

Also illustrated is metrics service 130. A metrics service may monitor and observe various system services and/or resources such as request routers and compute instances. A metrics service generally collects monitoring and operational data in the form of logs, metrics, and events, providing a view of system resources, applications, and services to clients of the service, in embodiments.

Generally, the illustrated scaling manager 104 manages scaling of the groups of instances 122*a*, 122*b*, 122*n*. For example, a metrics analyzer 106 may obtain metrics from the metrics service and determine whether a group of instances should be scaled. The metrics may also be used, by the scaling control manager 114, to calculate (e.g., FIG. 6, described below) a size of a data structure (e.g., deques 112*a*, 112*b*, 112*n*) used to track preinitialized instances (e.g., 124*a*, 124*b*, 124*n*) for a group of active instances. For a scaling operation, the scaling control manager 114 may check the scaling policy for the group in the scaling policy data store 108 to determine configurations for scaling the group (e.g., how many to scale at once, the type of instances used to scale, etc.). Based on the scaling policy the scaling control manager 104 scales the group of active instances (e.g., 122*a*) by selecting an identifier from the corresponding data structure (e.g., deque 112*a*) that tracks the collection of preinitialized instances (e.g., 124*a*) for the group and instructing the request router (e.g., 160*n*) for that group to start directing request traffic to the instance identified by that identifier. Scaling-up (e.g., FIGS. 2 and 3) as well as scaling-down (FIGS. 4 and 5) may be instructed by scaling control manager 114, in embodiments. A preinitialized instance deque manager 112 may manage the deques (e.g., changing the sizes of the deques, adding/removing identifiers from the front or back of the deques, as appropriate, and the like).

FIG. 2 is a process chart that illustrates a scale-up process for a system that implements scaling of groups of compute instances using rate-based dynamically-sized deques of preinitialized instances, according to at least some embodiments. In embodiments, a system monitors the historical scale-up rate for the particular group of instances and adjusts the size of the collection of preinitialized instances for that group based on the monitored scale-up rate and based on the instance preinitialization time (e.g., MTTT or other measure) for instances for that group. Components of a scaling manager 104 may perform the described functionality, in embodiments. While the illustrated embodiment describes an ASG and deque as a particular example, similar functionality may be performed by other groups of instances and other types of data structures.

At block 202 a determination is made to scale-up, by scaling control manager 114, for example. A scale-up operation may be performed for a group in response to any of various events (e.g., as specified in a scaling policy stored in a scaling policy data store 108), such as, but not limited to, based on performance of the underlying resources of the group, based on increased request traffic, etc. A determination is made whether an identifier of an instance is available in the deque for the group (block 204). If the deque is empty (block, 204, empty) a determination is made whether the ASG has reached a size limit (block 206) and if so (block 206, yes) the scale-up may not be allowed or may be prevented (block 208). If the size limit has not been reached (block 206, no) an instance may be obtained from the common pool of instances or from another ASG deque (block 210) and a process to add that instance to the ASG is triggered. For example, some techniques may include making a quantity (e.g., a percentage of active and/or static instances) of extra preinitialized instances available as a buffer against unexpected instance needs (e.g., unexpected bursts of request traffic, instance failures, etc.). In embodiments, the scaling manager 104 may request the instance provisioning manager 152 to obtain instances from the common pool. It is contemplated that such instances may be either preinitialized (e.g., warm) or not (e.g., cold) in various implementations.

If an identifier of an instance is available from the deque (block 204, available) the instance identifier is removed from the front of the deque and the process to add that instance to the ASG (e.g., FIG. 8, described below) is triggered (block 212). A bound can be placed on the total size of the group of instances plus the corresponding collection of preinitialized instances for the group, if desired, for some embodiments. At block, 214 a determination is made whether the size of the ASG+the size of the deque for that ASG is bounded and at block 216, a determination is made whether, if bounded, the ASG size plus the corresponding deque size at the size limit (e.g., reached a size-based threshold). If unbounded (block 214 unbounded) or the size limit has not been reached (block 216, no) the process to add an identifier for a new instance to the back of the deque for preinitialization (e.g., FIG. 7, described below) is triggered (block 220). If bounded, and the ASG size plus the corresponding deque size are at, or have exceeded a size limit or threshold (block 216, yes) an identifier for a new instance is not added to the back of the deque (block 218). In embodiments the bounding of the ASG plus the deque size is optional or may not be implemented at all.

FIG. 3 is a process chart that illustrates an alternative scale-up process for a system that implements scaling of groups of compute instances having a predetermined quantity of instances shared between the group and a respective collection of preinitialized instances for the autoscaling group (sometimes referred to herein as the assigned-but-unused technique), according to at least some embodiments. In some embodiments, the illustrated functionality may be performed by one or more components of scaling manager 104.

At block 302, a determination is made to scale-up. As described above for FIG. 2, the determination to scale-up may be made for any number of reasons, or be based on any number of events. At block 304, the system determines whether an identifier of an instance is available in the deque for the ASG. If not, the system determines whether a size limit for the ASG has been reached (block 306). The size limit for the ASG may be the predetermined quantity of instances shared between the group and a respective collection of preinitialized instances for the autoscaling group, in embodiments. If the limit has been reached (e.g., if some threshold has been reached) scale-up is not allowed (block 308). If the limit has not been reached (block 306, no) an instance is obtained from the common pool or from another deque of another ASG and the process to add that instance to the ASG is triggered (block 310).

For the case where the system determines that an identifier of the instance is available in the deque (block 304, yes) the instance identifier is removed from the front of the deque and the process to add that instance to the ASG is triggered (block 312). At block 314, the size of the deque is decreased (no replenishment of the removed instance is performed). For example, scaling manager 114 may instruct a request router 160n to start sending traffic to the instance and instruct preinitialized instance deque manager 112 to remove the identifier from the front of deque 112a. In embodiments, the lack of replenishment (and the related decrease in size of the deque) is what keeps the predetermined quantity of instances shared between the group and a respective collection of preinitialized instances for the autoscaling group constant. A related process for scaling-down is illustrated in FIG. 5 (described below) where the deque size is increased as the ASG down-scales instance back into the collection of preinitialized instances.

FIGS. 4 and 5 illustrate de-scaling processes. In particular, FIG. 4 is process chart that illustrates an embodiment of a scale-down process (e.g., for the rate-based example) for a system that implements combined active and preinitialized resource management for rapid autoscaling, according to at least some embodiments. FIG. 5 is process chart that illustrates an alternative embodiment of a scale-down process (e.g., for the assigned-but-unused example) for a system that implements combined active and preinitialized resource management for rapid autoscaling, according to at least some embodiments. Scaling-down may be performed by components of the scaling manager, by the scaling control manager 114, based on scaling policies stored in a scaling policy data store 108, for example.

At block 402, a determination is made to scale-down. Down-scaling may be performed for any number of reasons and/or based on any event, such as, but not limited to, based on performance of the underlying resources (e.g. based on metrics obtained from a metrics service 130 and/or metrics analyzed by metric analyzer 106), based on reduced request traffic, to conserve resources, etc.

At block 404, a determination is made whether the deque for the ASG is full. If not (block 404, no) removal of an instance from the ASG and addition of the identifier for the removed instance to the front of the deque is instructed (block 406). For example, scaling manager 114 may instruct a request router 160n to stop sending traffic to the Instanceal in ASG 122a and instruct preinitialized instance deque manager 112 to place the identifier in the front of deque 112a. If so, (404, yes) removal of an instance from the ASG and return of that instance to the common pool, is instructed.

Moving on to FIG. 5 (e.g., for the assigned-but-unused example) a determination is made to scale-down the ASG (block 502). In this case, a determination is made whether the sum of size of the ASG plus the size of the deque is at the assigned size (e.g., has the sum reached a threshold). Note that the sum may include an additional buffer amount of instances (e.g., a percentage of the instances), for responding to unexpected bursts in traffic of the like, for example. If over, removal of an instance from the ASG and return of the instance to the common pool is instructed (block 506). For example, scaling control manager 114 may instruct a component of the computer service or the request router (160n) directly, to stop directing request traffic to an instance of an of autoscale group 122a and instruct a component of the compute service 150 (e.g., the instance provisioning manager 152) to move an identifier for that instance back into a common pool of instances.

At block 508 (in the case where the sum of the size of the ASG plus the corresponding deque are at the assigned size (e.g., have reached a threshold)) removal of the instance from the ASG and increase of the size of the deque to maintain the assigned size for the sum of the ASG plus the deque is instructed. At block 510, the identifier for the removed instance is added to the front of the deque (e.g., by preinitialized instance deque manager 112).

FIG. 6 is a process flow diagram for calculating deque size for a system that implements combined active and preinitialized resource management for rapid autoscaling, according to at least some embodiments. The process may be performed for other types of data structures than just deques. The process may be performed at any of various configurable times and/or every so often, could be performed continuously, hourly, daily, weekly, yearly, etc. as non-exhaustive examples. Any of various events may trigger the process, such as the system obtaining new/updated scale-up rate information or a new/updated preinitialization time, as non-exhaustive examples. The calculation may be performed by a component of the scaling manager 104, such as the scaling control manager 114, in embodiments.

At block 602, an event triggering recalculation of the deque size for an ASG is received. As described above, example events may be time-based or event-based. Historical traffic rate information is accessed and a peak scale up rate from a time window within a time range of the traffic history is determined (block 604). The historical traffic information may be based on performance of the ASG. In some embodiments, such information may not be available and historical traffic information from other ASGs may be used. The traffic information may be for an ASG with the same type of instances or from a group running the same service, as non-exhaustive examples. In some embodiments, the historical data itself, and/or the peak scale up rate, could be default values.

A preinitialization time associated with the instance type of the ASG is determined. Preinitialization times may be based on measurements of actual preinitializations (for the same, similar or for different types of instances or services) or may be based on estimates provided to the system (e.g., by an admin or testing team, etc.) or may be based on default values, as non-exhaustive examples. Preinitialization times (measured or estimated) may change over time; calculation of the deque size may be trigged based on updated preinitialization times, in embodiments.

The deque size is based on the preinitialization time and the peak scale up rate. (e.g., based on the product of the preinitialization time and the peak scale up rate in block 608). In some embodiments, the deque size may include some buffer amount. In some embodiments, the deque length is dynamically computed. For example, given a historical time period (time range T1), the system may compute the maximum number of hosts (a peak rate) requested in a tumbling window (time range T2) within that time period. Assume the maximum number of hosts is X. Some embodiments may include increasing X by some percentage to consider error. Assume increasing X by some percentage is Y. In embodiments, the product of the MTTT and (Y/T2) is the size of the queue. The calculation may be performed every so often, depending on implementations (e.g., based on availability of updated MTTT or availability of updated historical rate information as non-exhaustive examples).

At block 612, based on the deque size not changing based on the recalculation (block 610, no) no change is made to the deque. At block 614, based on the deque size getting shorter based on the recalculation (block 610, shorter) the identifier for the instance is removed off the back of the deque, returned to the common pool, and the size of the deque is decreased (block 616). At block 618, based on the deque size getting longer based on the recalculation (block 610, longer) the size of the deque is expanded, and the process to add an identifier of a new instance to the back of the deque for preinitialization (e.g., similar to FIG. 7, described below) is triggered (block 620).

FIG. 7 is a process flow diagram for pre-initializing instances for a system that implements combined active and preinitialized resource management for rapid autoscaling, according to at least some embodiments. Portions of the illustrated process may be performed by components of a compute service 150, such as by scaling manager 104 and/or by instance provisioning manager 152, for example. Generally, the illustrated process describes a technique for transitioning a state of an instance from an uninitialized instance to a preinitialized instance. The process may be performed to build collections (e.g., PIInstance1a, PIInstance2a; PIinstance1b; PIInstance1n, PIInstance2n) of preinitialized instances 124a, 124b, 124n for respective autoscale groups (e.g., 122a, 122b, 122n) to scale up from or down into, in embodiments. Processes similar to the illustrated preinitialization process are described as trigged in a number of the other figures (e.g., FIG. 2 block 220, FIG. 6 block 620). The preinitialization process may be altered in various embodiments, such as by adding an identifier to a different part of the deque, for example, for by eliminating some of the illustrated function or adding additional functionality. In another example alternative, instances in various states of initialization may enter the process at different stages (e.g., a partially initialized instance from one deque may be added to another deque as part of the process).

At block 702, an instance is located from a common pool or other ASG deque to add to the deque. For example, in a case where an additional buffer amount of preinitialized instances are implemented as part of the collection(s), a deque of another ASG that has an available instance (e.g., an instance that has not been fully-initialized or has been initialized in a manner different from that needed) may be used as a source. In another example, scaling manager 104 may request the instance provisioning manager 152 to locate an instance from a pool of instances.

An identifier for the located instance is added to the back of the deque (block 704). A determination is made, based on a definition for instances in the ASG, of the preinitialization requirements for the instance (block 706). A package (or multiple packages), based on the determined preinitialization requirements, is installed on the instance (block 708) and the installed package is tested on the instance (block 710). Other additional testing may be performed. For example, run-time tests may be performed or repeated on pre-initialized instances that have spent some time in the deque. For example, run-time tests may be performed for preinitialized instances that have been sitting preinitialized but without processing traffic after some time threshold, such as, but not limited to, minutes, hours, days, etc. In the illustrated embodiment, preinitialization for an instance in a deque or an instance being placed into a deque is different from initializations of instances being placed directly into an ASG in that the preinitialization process for an instance in a deque stops short of directing traffic to the instance whereas initialization of instances being placed directly into an ASG (e.g., directly from a common pool) may include or end with directing traffic to the instance, in some cases.

FIG. 8 is a process flow diagram that illustrates adding preinitialized instances specified by a dequeue to an auto scaling group (ASG), for a system that implements combined active and preinitialized resource management for rapid autoscaling, according to at least some embodiments. The process may be performed by one or more components of scaling manager 104, in embodiments. The process is similar to that referred to in FIG. 2, blocks 210, 212; FIG. 3, blocks 310, 312, with some noted differences, in embodiments.

At block 802, an identifier of an instance to be added to an ASG is received. For example, for a scaling operation, scaling control manager 114 may determine to scale one of the autoscale groups 122*a-n* and ask the preinitialized instance deque manager 112 if there is an identifier for a preinitialized instance in the corresponding one of deque 112*a-n*. The preinitialized instance deque manager 112 may respond positively and provide the scaling control manager 114 with the identifier. In at least the illustrated embodiment, an initialization state for the identified instance may be determined (block 804). For example, scaling manager 114 may ask for the state of the identified preinitialized instance from the preinitialized instance deque manager 112 or the preinitialized instance deque manager 112 may make the determination. For a partially-initialized preinitialized instance the scaling manager may wait for initialization to complete (block 806). In either case, a corresponding request router is instructed to add the instance to the group (block 808), by the scaling control manager 114, for example. In some implementations, the request router may perform a sanity check for the instance (e.g., making sure the instance is addressable and can process traffic) and confirm back to the scaling control manager that the instance passed the sanity checks. At block 810 an acknowledgement is sent to the scaling control manager 114 that the instance has been successfully added to the ASG. In the case where the sanity check fails, the process may return to block 802, and repeat until successful, and/or send an error message, in embodiments.

FIGS. 9-11C illustrate various functionality associated with instances in various states. The key illustrates an ASG instance (an active instance of an autoscale group 122 receiving traffic from a request router 160 (ASG-Instance)) with a lightly-dotted pattern. The key illustrates a preinitialized instance having a state of initialization incomplete (ASG-PI-Instance (initialization not complete)) as a clear pattern, illustrates an incompletely-initialized instance as clear or white, and illustrates a preinitialized instance having a state of initialization of complete (ASG-PI-Instance (initialization complete)) as a heavily-dotted pattern. Generally, a deque is illustrated as the rectangle on the left side of the circle, and the ASG is illustrated as the right side of the circle.

Figure 9:
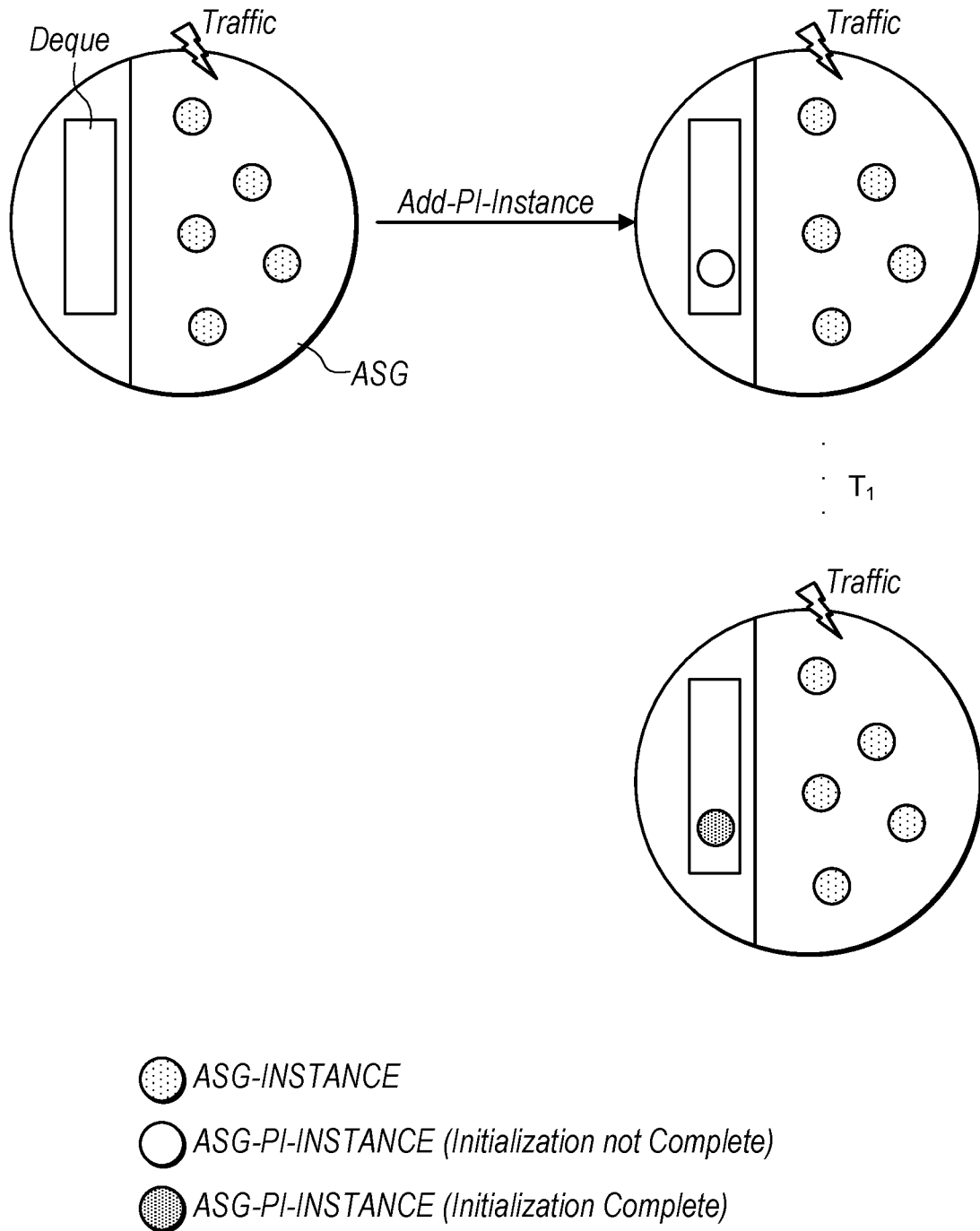
FIG. 9 is a diagram illustrating the add-preinitialized-instance functionality for a system that implements combined active and preinitialized resource management for rapid autoscaling, according to at least some embodiments.

FIG. 9 is a diagram illustrating the add-preinitialized-instance functionality (e.g., an application programming interface (API)) for a system that implements combined active and preinitialized resource management for rapid autoscaling, according to at least some embodiments. In the illustrated embodiment, the API adds a new instance to the back of the ASG deque and initializes that instance as a preinitialized instance (e.g., according to the process illustrated in FIG. 7, or similar). The lower circle indicates that after a preinitialization time $T_1$ (sometimes measured as mean time to traffic (MTTT)) or otherwise) the instance initialization is complete.

Figure 10:
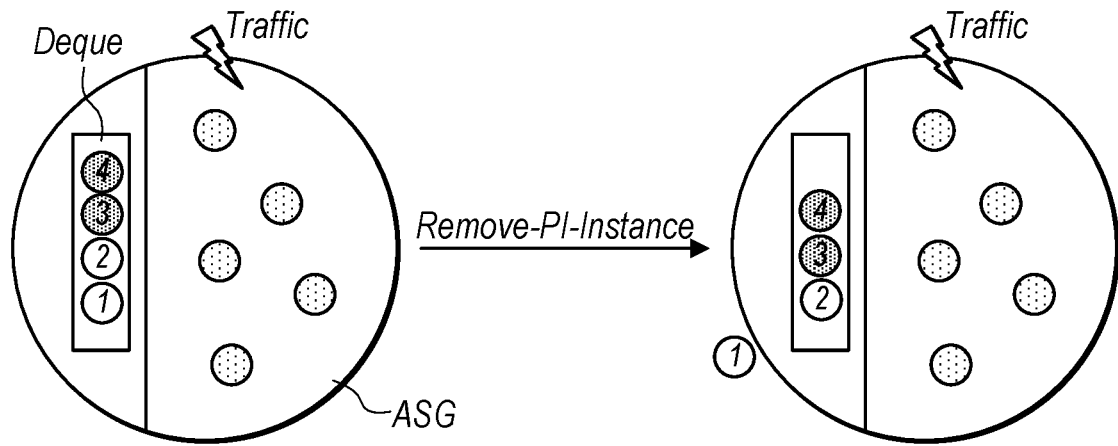
FIG. 10 is a diagram illustrating the remove-preinitialized-instance-from-deque functionality for a system that implements combined active and preinitialized resource management for rapid autoscaling, according to at least some embodiments.

FIG. 10 is a diagram illustrating the remove-preinitialized-instance-from-deque functionality (e.g., an application programming interface (API)) for a system that implements combined active and preinitialized resource management for rapid autoscaling, according to at least some embodiments. FIG. 10 illustrates removing an instance from a deque (and returning it to the general pool or some other place, such as to a deque of another ASG that needs an instance, for example). Such a process may be performed when the deque length is made shorter, in FIG. 6 at 614, for example. In the illustrated embodiment, an incompletely-initialized instance is removed from the deque, instead of a completely-initialized instance.

Figure 11A:
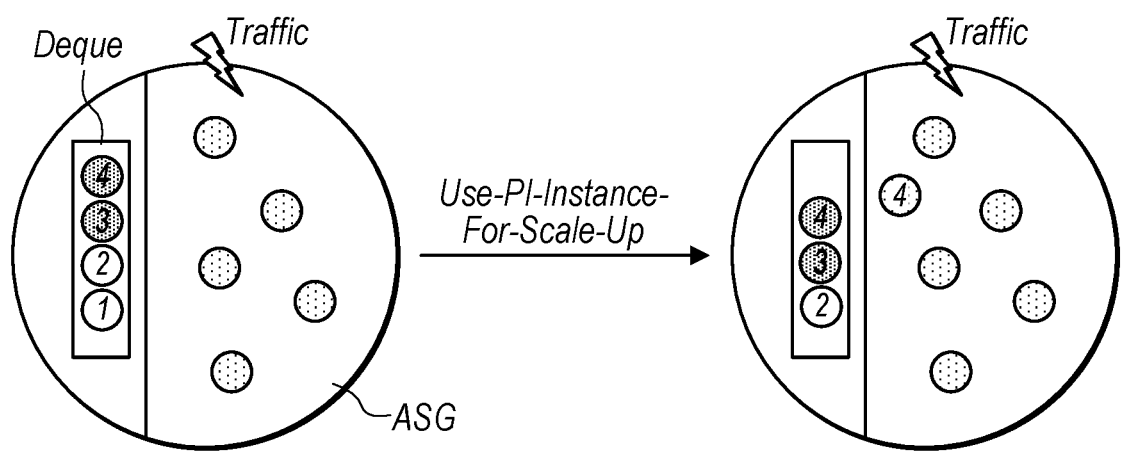
FIGS. 11A and 11B are diagrams illustrating the use-preinitialized-instance-for-scale-up functionality for a system that implements combined active and preinitialized resource management for rapid autoscaling, according to at least some embodiments.
Figure 11B:
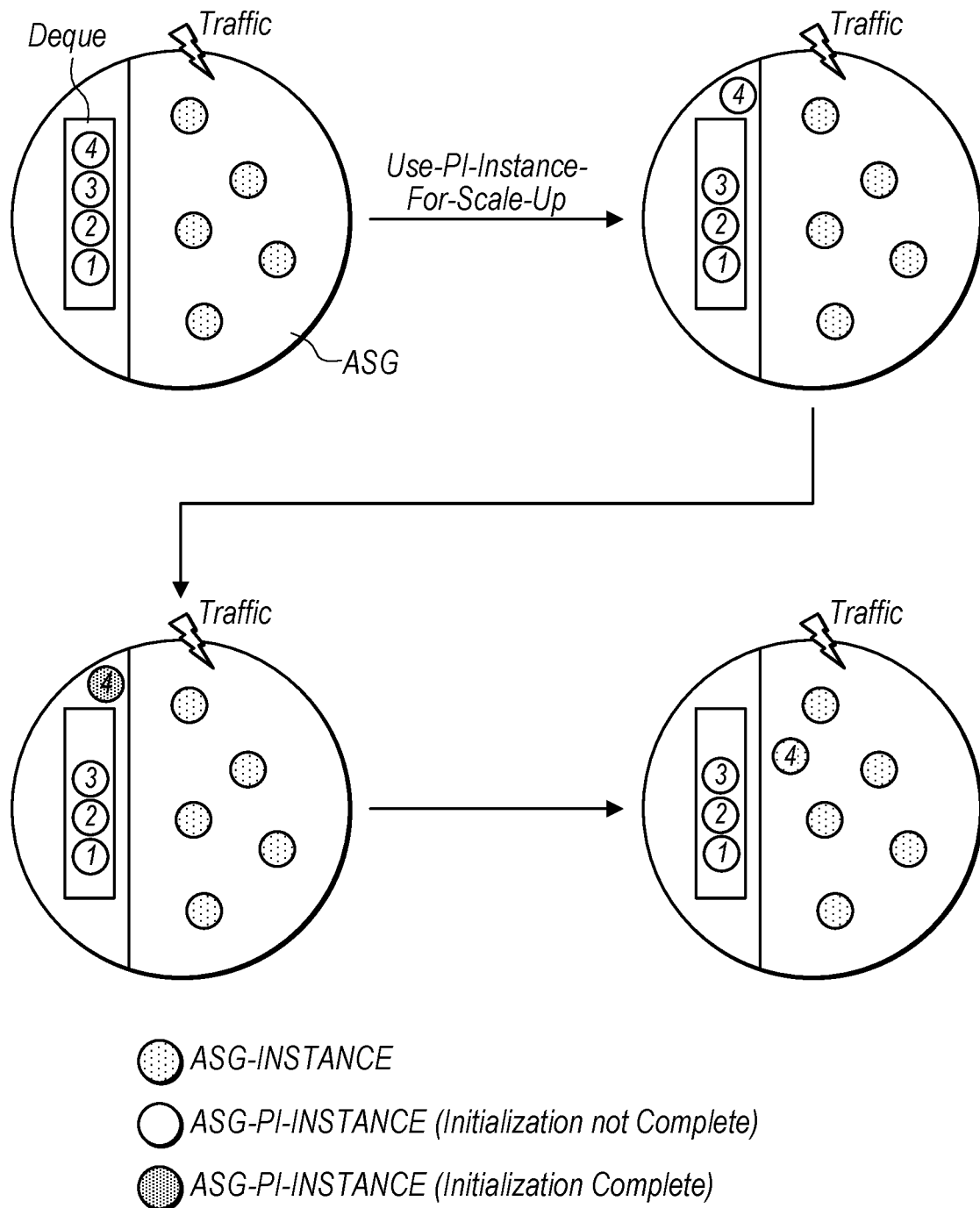

FIGS. 11A and 11B are diagrams illustrating the use-preinitialized-instance-for-scale-up functionality (e.g., an application programming interface (API)) for a system that implements combined active and preinitialized resource management for rapid autoscaling, according to at least some embodiments. FIG. 11A illustrates what happens in FIG. 8 for the case where the instance comes from the front of the deque and is already fully preinitialized, for example.

FIG. 11B illustrates, in the case of the use-preinitialized-instance-for-scale-up case, what happens for the case where the instance comes from the front of the deque and is not fully preinitialized (e.g., FIG. 8, block 806). If initialization is not complete, activation (instructing the request router to send traffic to the instance) involves (1.) Waiting for the instance to initialize (illustrated as circle 4 outside the deque, but not in the ASG either), (2.) Adding the instance to the request router, and (3.) Performing sanity checks (e.g., the request router may make sure the instance is addressable and can process traffic, or the like, etc.). In some of these cases, MTTT may take longer for the incompletely-initialized instances in the deque. In embodiments, if the deque is empty, the algorithm for scaling up of an ASG using a non-preinitialized instance may be used, although some implementations may send all instances through the deque.

Figure 12:
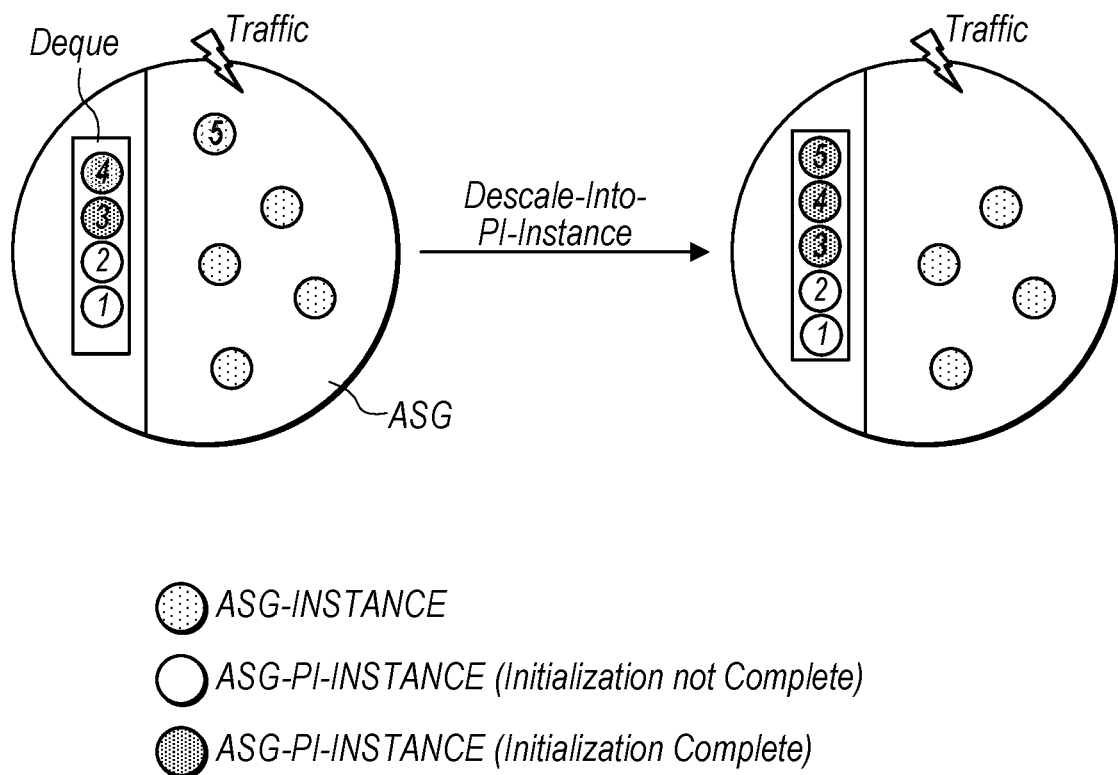
FIG. 12 is a diagram illustrating the descale-into-preinitialized-instance functionality for a system that implements combined active and preinitialized resource management for rapid autoscaling, according to at least some embodiments.

FIG. 12 is a diagram illustrating the Descale-into-preinitialized-instance functionality for a system that implements combined active and preinitialized resource management for rapid autoscaling, according to at least some embodiments.

FIG. 12 illustrates the case of down-scaling into the front of the deque (the system may or may not have to instruct expanding the size of deque to do this). FIG. 12 could be illustrative of either of the down scale embodiments, depending on the circumstances.

FIG. 13 is a block diagram illustrating a service-provider based architecture for a system that implements combined active and preinitialized resource management for rapid autoscaling, according to at least some embodiments. In the illustrated embodiment, autoscaling service 104 is illustrated as a component of compute service 150 that is a service provided by service provider network 1300. Autoscaling service 104 may perform at least some of the functionality illustrated in FIGS. 2-12, in embodiments.

Service provider network 1300 is illustrated as providing numerous other services, such as, but not limited to, a database service 1310 (providing relational, non-relational database services, or both), storage service(s) 1320 (e.g., key-value store, short-term, long-term, or the like, etc.), metrics service 130 (e.g., obtaining, aggregating and storing metrics about the various services of the service provider network) and clients 170. Clients 170 are illustrated as both external (communicably coupled via client networks 1360 and intermediate network 1370 (e.g., the Internet or similar) to the service provider network) and internal to the service provider network. In embodiments, one of the services of the service provider network may be a client of another one of the services. It is contemplated that the autoscale service 104 may be implemented as a service, external to the compute service(s) 150, in embodiments (not illustrated).

Illustrative System

FIG. 14 is a block diagram illustrating an example computer system that may be used in some embodiments of a system that implements combined active and preinitialized resource management for rapid autoscaling, according to at least some embodiments.

In at least some embodiments, a compute service that implements a portion or all of the combined active and preinitialized resource management for rapid autoscaling methods and apparatus as described herein may include a general-purpose computer system that includes or is configured to access one or more computer-accessible media, such as computer system 1400 illustrated in FIG. 14. Clients 170, metrics service 130 and the services illustrated in FIG. 13 may also be implemented by the example computer system, in embodiments.

In the illustrated embodiment, computer system 1400 includes one or more processors 1410 coupled to a system memory 1420 via an input/output (I/O) interface 1430. Computer system 1400 further includes a network interface 1440 coupled to I/O interface 1430.

In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA.

System memory 1420 may be configured to store instructions and data accessible by processor(s) 1210. In various embodiments, system memory 1420 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for combined active and preinitialized resource management for rapid autoscaling, are shown stored within system memory 1420 as scaling manager code 1424 and data 1426.

In one embodiment, I/O interface 1430 may be configured to coordinate I/O traffic between processor 1410, system memory 1420, and any peripheral devices in the device, including network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computer system 1400 and other devices 1460 attached to a network or networks 1470, such as other computer systems or devices as illustrated in FIGS. 1 and 13, for example. In various embodiments, network interface 1440 may support communication via any suitable wired or wireless general data networks, such as types of Ethernet network, for example. Additionally, network interface 1440 may support communication via telecommunications/telephony networks such as analog voice networks or digital fiber communications networks, via storage area networks such as Fibre Channel SANs, or via any other suitable type of network and/or protocol.

In some embodiments, system memory 1420 may be one embodiment of a computer-accessible medium configured to store program instructions and data as described above for FIGS. 1 through 13 for implementing embodiments of combined active and preinitialized resource management for rapid autoscaling. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1400 via I/O interface 1430. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1400 as system memory 1420 or another type of memory. Further, a computer-accessible medium may include transmission media or signals such as electrical, electromagnetic, or digital signals, conveyed via a communication medium such as a network and/or a wireless link, such as may be implemented via network interface 1440.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software (e.g., computer-readable program instructions), hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of computers at least some of which are configured to implement a group of active compute instances configured to execute a service;
one or more request routers configured to receive requests for the service and route respective ones of the received requests to individual ones of the active compute instances to handle the received requests; and
one or more computers configured to implement a scaling manager configured to:
maintain a data structure identifying a quantity of preinitialized compute instances for scaling the group of active compute instances, wherein the preinitialized compute instances are configured to execute the service but do not receive requests for the service;
perform scaling scale up and scaling down for the group of active compute instances;
wherein to perform the scaling down the scaling manager is configured to:
instruct the one or more request routers to cease routing requests for the service to a selected compute instance of the group; and
add an identifier for the selected compute instance to the data structure such that the quantity of preinitialized compute instances increases;
wherein to perform the scaling up the scaling manager is configured to:
remove an identifier for a first preinitialized compute instance from the data structure and instruct the one or more request routers to add the first preinitialized compute instance to the group as an active compute instance to handle requests for the service; and
refrain from adding an identifier for a new compute instance to the data structure so that the quantity of preinitialized compute instances for scaling the group is reduced responsive to the scale up operation.

2. The system of claim 1,
wherein during a normal operating state the scaling manager is configured to maintain the quantity of preinitialized compute instances identified in the data structure plus a quantity of active compute instances in the group at a predetermined assigned quantity such that the quantity of preinitialized compute instances identified in the data structure increases when the group of active instances is scaled down and decreases when the group of active instances is scaled up.

3. The system of claim 2,
wherein the scaling manager provides an interface configured to receive configuration input specifying an upper size for the group and a buffer quantity for the group, wherein the predetermined assigned quantity is set at the upper size plus the buffer quantity.

4. The system of claim 3,
wherein to perform the scale up operation, the scaling manager is configured to:
responsive to a determination that data structure is empty of identifiers of preinitialized compute instances, remove an identifier for a preinitialized compute instance from a different data structure for another group of compute instances for another service; and
use the compute instance identified from the other data structure to perform the scale up operation such that the quantity of active compute instances in the group exceeds the predetermined assigned quantity.

5. The system of claim 1,
wherein the plurality of computers are configured to implement part of a compute service of a multi-tenant service provider network that provides a compute service for a plurality of distinct customer accounts; and
the scaling manager is configured to implement part of an autoscaling service implemented by the compute service of the multi-tenant service provider network.

6. A method, comprising:
performing by one or more computers:
maintaining a data structure identifying a quantity of preinitialized compute instances for scaling a group of active compute instances for a service, wherein the preinitialized compute instances are configured to execute the service but do not receive requests for the service;
scaling up by a scaling manager and scaling down by the scaling manager, the group of active compute instances,
wherein scaling down comprises:
instructing one or more request routers to cease routing requests for the service to a selected compute instance of the group; and
adding an identifier for the selected compute instance to the data structure such that the quantity of preinitialized compute instances increases; and,
wherein scaling up comprises:
removing an identifier for a first preinitialized compute instance from the data structure and instructing the one or more request routers to add the first preinitialized compute instance to the group as an active compute instance to handle requests for the service; and
refraining from adding an identifier for a new compute instance to the data structure so that the quantity of preinitialized compute instances for scaling the group is reduced responsive to the scale up operation.

7. The method of claim 6, wherein:
adding the identifier for the selected compute instance to the data structure such that the quantity of preinitialized compute instances increases comprises:

selecting a compute instance from a common pool of compute instances, wherein the common pool is for the group and one or more other groups;

initiating a preinitialization process to preinitialize the selected compute instance for the service; and adding the identifier for the new compute instance to the data structure.

8. The method of claim 6, further comprising:

responding, to a scaling-up request for another group of active compute instances that have reached a size limit, with an indication that the scaling-up is not allowed.

9. The method of claim 6, wherein:

the data structure is a deque, and the method further comprises removing identifiers of preinitialized compute instances from a front end of the deque when performing the scaling up, and adding identifiers for new preinitialized compute instances to a back end of the deque.

10. The method of claim 9, wherein performing the scale up operation for the group comprises:

determining whether the preinitialized compute instance selected from the front end of the deque is fully preinitialized for the service; and delaying, responsive to the selected preinitialized compute instance not being fully preinitialized for the service, instruction of the one or more request routers to add the first preinitialized compute instance to the group as an active compute instance until preinitialization of the selected preinitialized compute instance is complete.

11. The method of claim 6, further comprising:

maintaining, during a normal operating state for the scaling manager, the quantity of preinitialized compute instances identified in the data structure plus a quantity of active compute instances in the group at a predetermined assigned quantity such that the quantity of preinitialized compute instances identified in the data structure increases when the group of active instances is scaled down and decreases when the group of active instances is scaled up.

12. The method of claim 11, further comprising:

receiving, via an interface, configuration input specifying an upper size for the group and a buffer quantity for the group, wherein the predetermined assigned quantity is set at the upper size plus the buffer quantity.

13. The method of claim 12, wherein the scaling up comprises:

removing, responsive to a determination that data structure is empty of identifiers of preinitialized compute instances, an identifier for a preinitialized compute instance from a different data structure for another group of compute instances for another service; and using the compute instance identified from the other data structure to perform the scaling up such that the quantity of active compute instances in the group exceeds the predetermined assigned quantity.

14. One or more non-transitory computer-readable media storing program instructions executable on or across one or more processors to implement a scaling manager configured to perform:

maintaining a data structure identifying a quantity of preinitialized compute instances for scaling a group of active compute instances for a service, wherein the preinitialized compute instances are configured to execute the service but do not receive requests for the service;

scaling up the group of active compute instances and scaling down the group of active compute instances, wherein scaling down comprises:

instructing one or more request routers to cease routing requests for the service to a selected compute instance of the group; and adding an identifier for the selected compute instance to the data structure such that the quantity of preinitialized compute instances increases; and, wherein scaling up comprises:

removing an identifier for a first preinitialized compute instance from the data structure and instructing the one or more request routers to add the first preinitialized compute instance to the group as an active compute instance to handle requests for the service; and refraining from adding an identifier for a new compute instance to the data structure so that the quantity of preinitialized compute instances for scaling the group is reduced responsive to the scale up operation.

15. The one or more non-transitory media of claim 14, wherein:

adding the identifier for the selected compute instance to the data structure such that the quantity of preinitialized compute instances increases comprises:

selecting a compute instance from a common pool of compute instances, wherein the common pool is for the group and one or more other groups;

initiating a preinitialization process to preinitialize the selected compute instance for the service; and adding the identifier for the new compute instance to the data structure.

16. The one or more non-transitory media of claim 14, wherein the scaling manager is further configured to perform:

responding, to a scaling-up request for another group of active compute instances that have reached a size limit, with an indication that the scaling-up is not allowed.

17. The one or more non-transitory media of claim 14, wherein:

the data structure is a deque, and the scaling manager is further configured to perform removing identifiers of preinitialized compute instances from a front end of the deque when performing the scaling up, and adding identifiers for new preinitialized compute instances to a back end of the deque.

18. The one or more non-transitory media of claim 17, wherein said performing the scaling up for the group comprises:

determining whether the preinitialized compute instance selected from the front end of the deque is fully preinitialized for the service; and delaying, responsive to the selected preinitialized compute instance not being fully preinitialized for the service, instruction of the one or more request routers to add the first preinitialized compute instance to the group as an active compute instance until preinitialization of the selected preinitialized compute instance is complete.

19. The one or more non-transitory media of claim 14, wherein the scaling manager is further configured to perform:

maintaining, during a normal operating state for the scaling manager, the quantity of preinitialized compute instances identified in the data structure plus a quantity of active compute instances in the group at a predetermined assigned quantity such that the quantity of preinitialized compute instances identified in the data structure increases when the group of active instances is scaled down and decreases when the group of active instances is scaled up.

20. The one or more non-transitory media of claim 19, wherein the scaling manager is further configured to perform:

receiving configuration input specifying an upper size for the group and a buffer quantity for the group, wherein the predetermined assigned quantity is set at the upper size plus the buffer quantity.

* * * * *